(12) United States Patent
Kalish et al.

(10) Patent No.: US 7,213,553 B2
(45) Date of Patent: May 8, 2007

(54) INTERNAL EGR FOR AN INTERNAL COMBUSTION ENGINE

(75) Inventors: Yury Kalish, West Bloomfield, MI (US); James McCarthy, Canton, MI (US); Michael E. Ryzer, deceased, late of Windsor (CA); by Eugene Ryzer, legal representative, Windsor (CA)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/269,114

(22) Filed: Nov. 8, 2005

(65) Prior Publication Data

US 2006/0102121 A1  May 18, 2006

Related U.S. Application Data

(60) Provisional application No. 60/627,305, filed on Nov. 12, 2004.

(51) Int. Cl.
*F01L 1/34* (2006.01)

(52) U.S. Cl. .............. 123/90.16; 123/90.15; 123/90.4; 123/568.11; 123/568.17

(58) Field of Classification Search ........... 123/568.11, 123/568.17, 568.18, 90.16, 90.15, 90.31, 123/90.4

See application file for complete search history.

(56) References Cited

U.S. PATENT DOCUMENTS 4,041,913 A  8/1977  Nohira
4,142,491 A  3/1979  Hibino et al.
4,173,205 A  11/1979  Toelle
4,357,917 A  11/1982  Aoyama
4,722,315 A  2/1988  Pickel
5,031,879 A  7/1991  Umlauf, Jr.
5,539,638 A  7/1996  Keeler et al.
5,934,263 A  8/1999  Russ et al.
6,308,666 B1 *  10/2001  Drecq ................. 123/58.8
6,360,159 B1  3/2002  Miller et al.
6,968,831 B2 *  11/2005  Kim et al. ........... 123/568.11

* cited by examiner

*Primary Examiner*—Thomas Denion
*Assistant Examiner*—Zelalem Eshete
(74) *Attorney, Agent, or Firm*—Brooks Kushman P.C.

(57) ABSTRACT

An exhaust gas recirculation (EGR) system for use in a four-stroke, internal combustion, compression-ignition engine having at least one engine cylinder, at east one combustion chamber, at least one intake valve and a crankshaft. The EGR system includes at least one exhaust gas intake valve that is opened during at least a portion of an engine intake stroke when the exhaust gas pressure is greater than the pressure of gas in the combustion chamber, thus allowing exhaust gas to flow into the combustion chamber to establish internal EGR. A cam-operated intake rocker arm assembly has the form of both a first class lever and a second class lever. The first class lever directly communicates motion of the intake rocker arm assembly to open the intake valve, and the second class lever communicates motion of the intake rocker arm assembly through a hydraulic transfer assembly to open the exhaust gas intake valve.

26 Claims, 5 Drawing Sheets

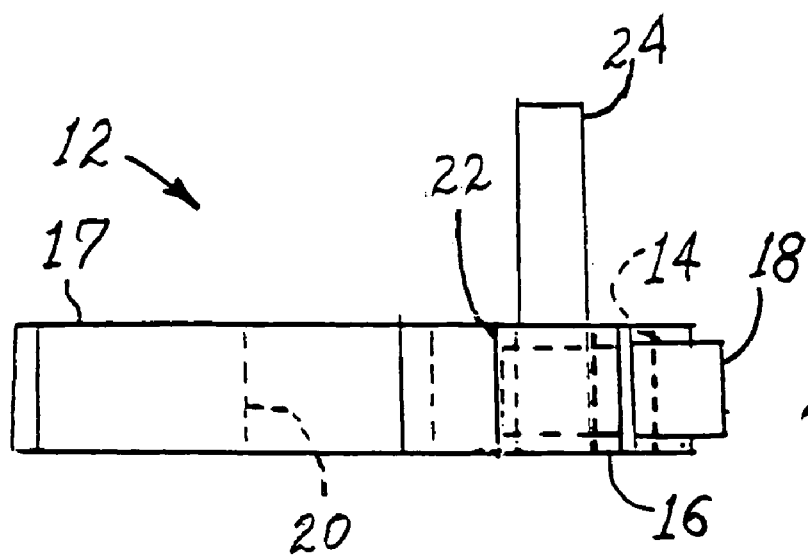

INTERNAL EGR FOR AN INTERNAL COMBUSTION ENGINE

CROSS-REFERENCE TO RELATED APPLICATIONS

This application claims the benefit U.S. provisional application Ser. No. 60/627,305, filed Nov. 12, 2004.

BACKGROUND OF THE INVENTION

1. Field of the Invention

This invention relates to exhaust gas recirculation (EGR) systems, and more particularly to EGR systems that draw a portion of exhaust gases through valves back into combustion chambers of four-stroke, internal combustion, compression-ignition engines.

2. Background Art

Exhaust gas recirculation (EGR) is a known approach to reducing diesel engine emissions. In typical internal combustion engines, fuel is mixed with air and ignited in a combustion chamber. Air comprises roughly 78 percent nitrogen, 21 percent oxygen, and 1 percent other gases. Fuel and oxygen take part in combustion and, at sufficiently high temperatures, normally inert nitrogen reacts with the oxygen to form nitric oxide (NO). Upon being released into the atmosphere, nitric oxide readily oxidizes to form toxic nitrogen dioxide ($NO_2$). This can be photochemically decomposed by sunlight to form nitric oxide and atomic oxygen, and the latter can initiate a reaction to form ozone.

Temperature has the greatest influence on the rate of formation of nitric oxide from atmospheric nitrogen. The reduction of combustion temperatures in an engine generally reduces the production of oxides of nitrogen (NOx), and combustion temperatures can be reduced by the presence in combustion chambers of a portion of exhaust gases produced during a previous cycle of the engine.

There are three common methods for ensuring the presence of exhaust gases. The first includes an external EGR system that routes a portion of exhaust gases from an engine's exhaust manifold to an engine's intake manifold. In this method, the exhaust gases are mixed with intake air before being drawn into the engine's combustion chambers through its intake valves. The second method retains a portion of the exhaust gases from a previous cycle within the engine's combustion chambers. The third method includes an internal EGR system that draws a portion of the exhaust gases from a previous cycle back into the engine's combustion chambers through its exhaust valves. The present invention represents a novel device for drawing exhaust gases into combustion chambers through valves controlled by intake rocker arms.

SUMMARY OF THE INVENTION

In accordance with the present invention, provided is an internal exhaust gas recirculation (EGR) system for use with a four-stroke, internal combustion, compression-ignition engine. The system has two apparatuses for admitting gas into each of at least one combustion chamber. The first apparatus includes at least one intake valve that admits air into an at least one combustion chamber during an intake stroke. The second apparatus includes at least one exhaust gas intake valve that admits exhaust gas into the at least one combustion chamber during a portion of an intake stroke when the intake valve is open and when the pressure of exhaust gas is greater than the pressure of gases in the combustion chamber. The admitted exhaust gas cools gases in the combustion chamber, resulting in a reduction of the oxides of nitrogen (NOx).

The engine additionally has at least one engine cylinder and a crankshaft, and the internal EGR system includes a rocker arm shaft fixedly supported by the engine. For each at least one combustion chamber, there is an intake rocker arm assembly having a driven end portion and a driving end portion. The intake rocker arm assembly includes an elongate body that is generally centrally pivotable about the rocker arm shaft. A force transfer assembly, which is preferably operated hydraulically, is fixedly disposed relative to the rocker arm shaft to receive forces emanating from the intake rocker arm assembly when the latter is pivoted. For each combustion chamber, a hydraulic fluid housing is disposed within the force transfer assembly. Each hydraulic fluid housing has therein a follower piston cylinder and a driven piston cylinder that communicate with each other and with a hydraulic fluid orifice via a hydraulic fluid passage extending therebetween. A follower piston is slidably disposed at least partially within the follower piston cylinder, and a driven piston is slidably disposed at least partially within the driven piston cylinder. The driven piston is forced outwardly from the driven piston cylinder when the follower piston is forced into the follower piston cylinder, and the follower piston is subsequently forced outwardly from the follower piston cylinder when the driven piston is forced inwardly into the driven piston cylinder.

A cam for each combustion chamber is mounted on and rotatable with a camshaft to pivot, in alternate angular directions, the intake rocker arm assembly. The at least one intake valve responds to the intake rocker arm assembly pivoting by alternately opening and closing, and at least one exhaust gas intake valve is included that responds to inward and outward motions of the driven piston by respectively opening and closing.

The EGR system also includes, for each combustion chamber, a driven piston follower disposed between the driven piston and the at least one exhaust gas intake valve. The at least one exhaust gas intake valve preferably includes a pair of exhaust gas intake valves. Each intake rocker arm assembly further includes a pin housing fixedly disposed on the elongate body between the driven end portion of the intake rocker arm assembly and the rocker arm shaft, and a rocker arm pin extends from the pin housing and is parallel to and spaced apart from the rocker arm shaft. The rocker arm pin is in contact with the follower piston to communicate reciprocal and generally vertical movements of the driven end portion of the intake rocker arm assembly to the follower piston.

Each intake rocker arm assembly further includes a rocker arm roller shaft that extends through a rocker arm roller shaft bore through the elongate body proximate the driven end portion of the intake rocker arm assembly. Each rocker arm roller shaft is parallel to and spaced apart from the rocker arm shaft; and a rocker arm roller is rotatably mounted on each rocker arm roller shaft. Each rocker arm roller is in contact with a cam to rotate therewith and communicate movements reflective of contours of the cam to the driven end portion of the intake rocker arm assembly.

The EGR system further includes a solenoid valve connected between an orifice communicating with the hydraulic fluid passage and a source of hydraulic fluid. The solenoid controls the flow of hydraulic fluid therebetween.

For each combustion chamber, the configurations and relative orientations of the intake rocker arm assembly and the force transfer assembly are such that, during a period when the at least one exhaust gas intake valve is opened during at least a portion of an engine intake stroke when the pressure of exhaust gas is greater than the pressure of gas in the combustion chamber, exhaust gas flows into the combustion chamber to establish internal exhaust gas recirculation.

BRIEF DESCRIPTION OF THE DRAWINGS

A more complete appreciation of the invention may be readily obtained by reference to the following detailed description when considered with the accompanying drawings in which like reference characters indicate corresponding parts in all the views, wherein:

FIG. 5 shows a top view of an intake rocker arm assembly of FIG. 4.

DETAILED DESCRIPTION OF THE PREFERRED EMBODIMENT

Figure 1:
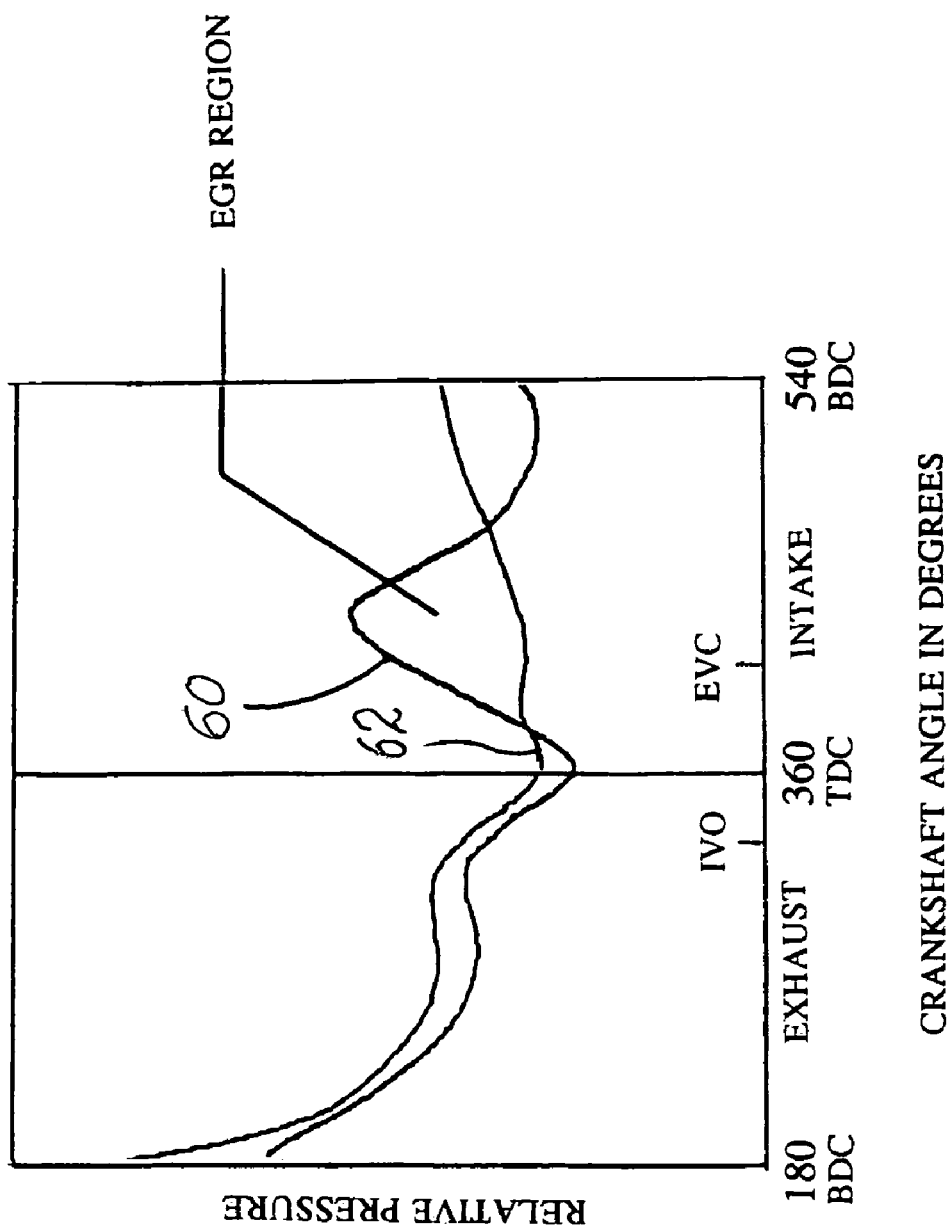
FIG. 1 is a graphic representation of combustion chamber pressure and of exhaust pressure with respect to angular crankshaft disposition of a known, four-stroke, internal combustion, compression-ignition engine.

FIG. 1 shows a graph the vertical axis of which represents relative gas pressures present in a combustion chamber of, and in an exhaust manifold of, a known, four-stroke, internal combustion, compression-ignition engine. The horizontal axis of the graph represents angular disposition, in degrees, of an engine crankshaft. The graph illustrates these parameters as indicated during an exhaust stroke and a subsequent intake stroke. A curve 60 represents exhaust pressure, and a curve 62 represents combustion chamber pressure. Both curves 60 and 62 are shown during the exhaust stroke, when the crankshaft is angularly disposed between 180 and 360 degrees, that is, between bottom dead center (BDC) and top dead center (TDC) respectively. They are also shown during a subsequent intake stroke, when the crankshaft is angularly disposed between 360 and 540 degrees, that is, between top dead center (TDC) and bottom dead center (BDC) respectively. Also indicated on the horizontal axis of FIG. 1 are the points indicated respectively as WO (intake valve open) and EVC (exhaust valve closed) at which respective points an intake valve opens and an exhaust valve closes.

During the exhaust stroke, the curves 62 and 60 representing the respective combustion chamber and exhaust pressures share similar amplitudes and rates of change. During the intake stroke, however, the exhaust pressure, illustrated by the curve 60, initially rises at a greater rate than does the combustion chamber pressure, indicated by the curve 62. Subsequently, during the intake stroke, the exhaust pressure increases to levels above that of the combustion chamber pressure. The period during which the exhaust pressure exceeds the combustion chamber pressure is indicated by the graph as an EGR REGION.

Figure 2:
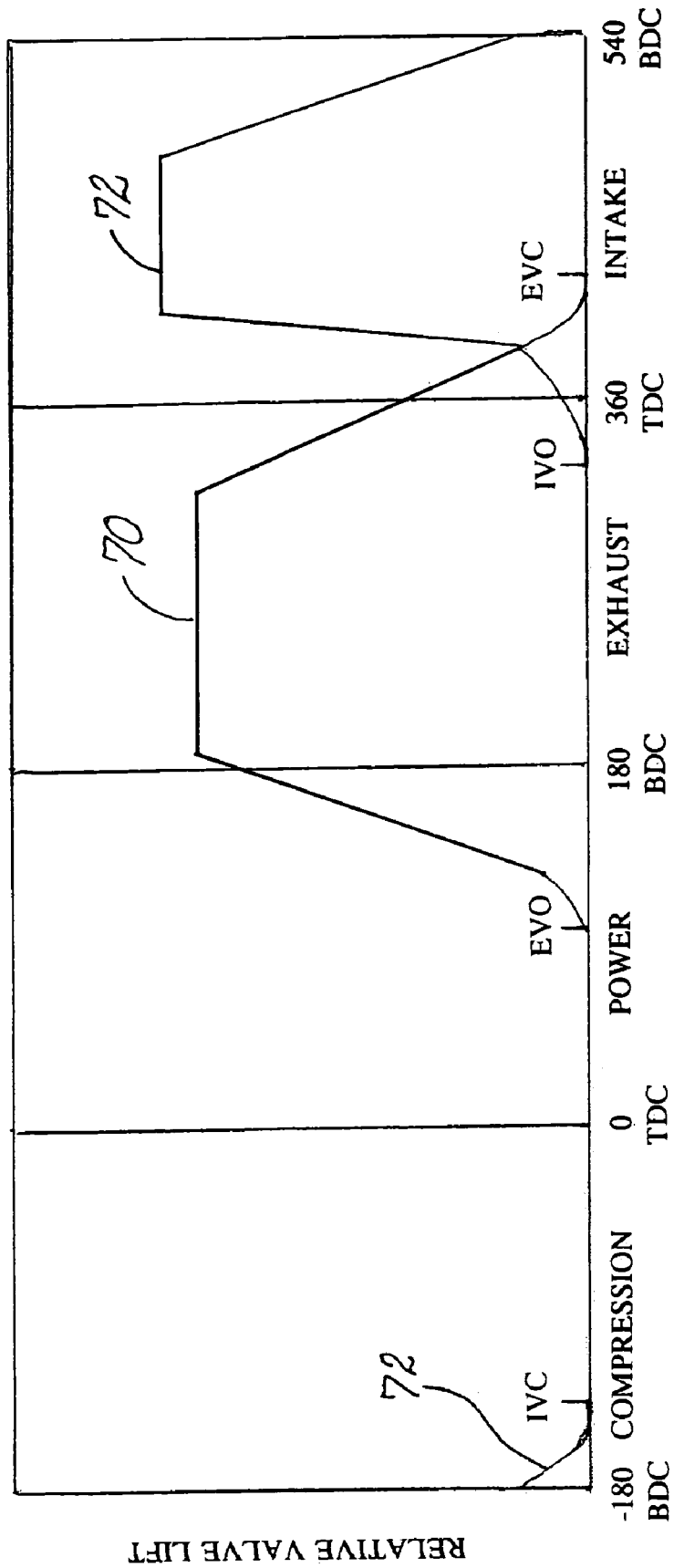
FIG. 2 is a graphic representation of intake valve lift and of exhaust valve lift with respect to angular crankshaft disposition of a known, four-stroke, internal combustion, compression-ignition engine.

FIG. 2 shows a graph the vertical axis of which represents relative intake valve and exhaust valve lift of a known, four-stroke, internal combustion, compression-ignition engine. The graph shown includes a curve 70 that illustrates relative exhaust valve lift. The curve 70 extends from a location (EVO) in a power stroke, at which the at least one exhaust valve opens, through the exhaust stroke, to a location (EVC) in the intake stroke, at which the at least one exhaust valve closes. The graph also includes a curve 72 that illustrates intake valve lift. The curve 72 extends from a location (IVO) in the exhaust stroke, at which the intake valve opens, through the intake stroke, to a location (IVC) in the compression stroke, at which the intake valve closes. As shown, the at least one exhaust valve remains open for a period after the angular disposition of the camshaft reaches its TDC point.

Figure 3:
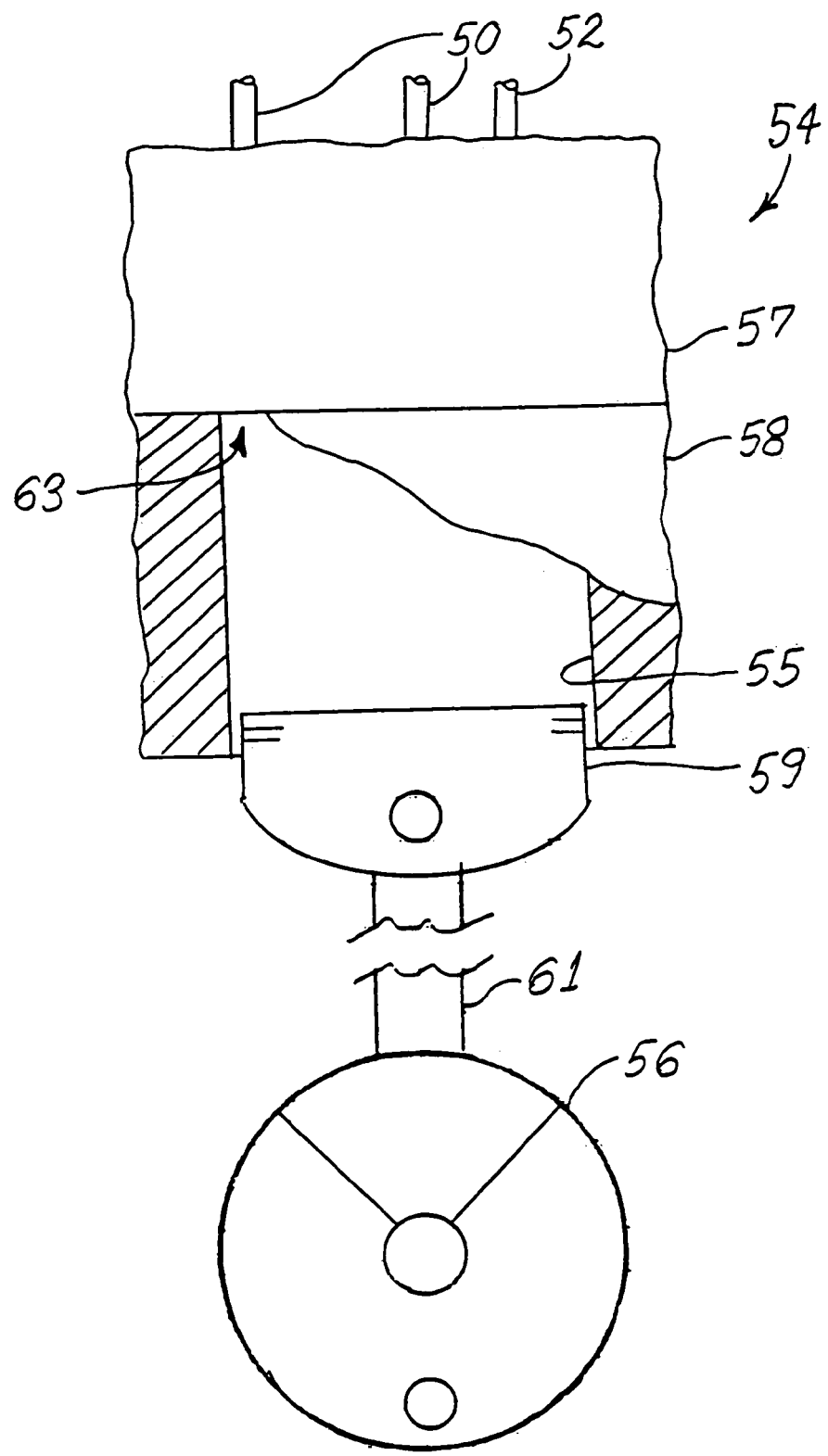
FIG. 3 is a side view, partially cut away and in section, of a four-stroke, internal combustion, compression-ignition engine of the present invention.

FIG. 3 is representative of a portion of a four-stroke, internal combustion, compression-ignition engine, generally indicated by reference numeral 54, equipped with an internal exhaust gas recirculation (EGR) system, generally indicated by reference numeral 10. The system 10 has two apparatuses for admitting gas into each of at least one combustion chamber 63 (FIG. 3) of the engine 54. The first apparatus includes at least one intake valve 52 that admits air into an at least one combustion chamber 63 during an intake stroke. The second apparatus includes at least one exhaust gas intake valve 50 that is responsive to movement of the at least intake valve 52 and that admits exhaust gas into the at least one combustion chamber 63 during a portion of an intake stroke when the intake valve 52 is open and when the pressure of exhaust gas is greater than the pressure of gases in the combustion chamber 63 (FIG. 1). The exhaust gas admitted cools the combustion chamber gas, resulting in a reduction of the oxides of nitrogen (Nox).

The engine 54 has a crankshaft 56, at least one engine cylinder 55 and at least one combustion chamber 63, the latter being generally defined as being the space within an engine cylinder 55 and between the head 57 and an engine piston 59 when the crankshaft 56 is positioned at top dead center. As further shown, the engine includes an engine block 58, a head 57 secured to the engine block, and at least one engine piston 59 slidably disposed within the engine cylinder 55. A connecting rod 61 is pivotally connected between the engine piston 59 and the crankshaft 56. Representations are also shown of at least one intake valve 52 and at least one exhaust gas intake valve 50 respectively.

Figure 4:
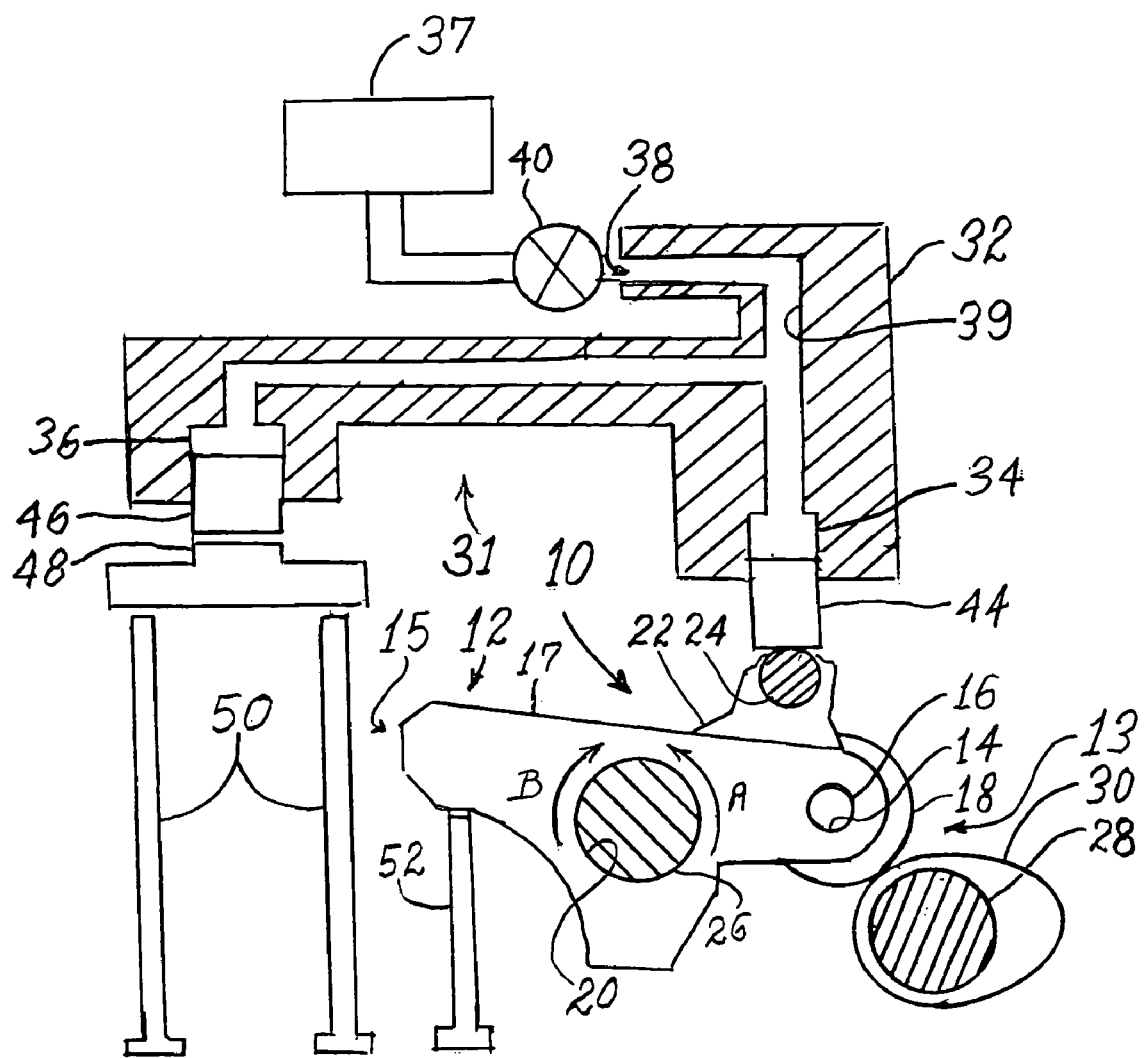
FIG. 4 shows a side view, partially broken away and in section, of an exhaust gas recirculation (EGR) system of the present invention.

With reference to FIG. 4, in the present invention, the at least one exhaust gas intake valve 50 is maintained in an open position during at least a portion of the period during which the exhaust pressure exceeds the combustion chamber pressure during an intake stroke. This permits exhaust gases to flow from an exhaust manifold (not shown), through the at least one exhaust gas intake valve 50, into the at least one combustion chamber, thereby achieving internal exhaust gas recirculation (EGR). A single device, an intake rocker arm assembly, generally indicated by reference numeral 12, is used not only to open the at least one intake valve 52 but also to initiate the opening of the at least one exhaust gas intake valve 50. Using the same device to initiate opening the at least one exhaust gas intake valve 50 and the at least one intake valve 52 ensures that the period between the opening time of one with respect to the opening time of the other remains constant. Although it is not shown, the valves are typically closed by a resilient member such as a spring.

FIG. 4 illustrates an internal exhaust gas recirculation (EGR) system, generally indicated by reference numeral 10. The EGR system 10 includes an intake rocker arm assembly, shown from its side and generally indicated by reference number 12. A top view of the intake rocker arm assembly 12 is illustrated by FIG. 5. The intake rocker arm assembly 12 is basically a lever for modifying and communicating force and motion. Like all three classes of levers, the intake rocker arm assembly 12 has a point at which force is applied to it, a fulcrum about which the intake rocker arm assembly 12 is pivotable, and a point at which force is applied by it to induce motion in something else. The configuration of the intake rocker arm assembly 12 is such that it constitutes both first and second class levers. The two levers share the same point to which force is applied to them, and they share the same fulcrum; but the at least one intake valve 52 and the at least one exhaust gas intake valve 50 are respectively opened as a result of a dual function of the intake rocker arm assembly 12 using forces emanating from separate points on the intake rocker arm assembly 12 when the latter is pivoted in a first angular direction A.

The intake rocker arm assembly 12, of which there is one for each combustion chamber 63, includes an elongate body 17 and has a driven end portion, generally indicated by reference numeral 13, and a driving end portion, generally indicated by reference numeral 15, at respectively opposite ends. The intake rocker arm assembly 12 is pivotally mounted on a rocker arm shaft 26 located within a rocker arm shaft bore 20 extending laterally through the elongate body 17 and between the two end portions 13 and 15. The rocker arm shaft 26 is fixedly supported by the engine 54 (FIG. 3). The at least one intake valve 52 is opened in response to an intake-valve-actuating force that emanates from the driving end portion 15 of the intake rocker arm assembly 12 when the intake rocker arm assembly 12 is pivoted in the first angular direction A. The at least one exhaust gas intake valve 50 is opened in response to an exhaust-gas-intake-valve-actuating force that emanates from a point between the driven end portion 13 and the rocker arm shaft 26 when the intake rocker arm assembly 12 is pivoted in the first angular direction A.

A rocker arm roller 18 is rotatably mounted on a rocker arm roller shaft 16 located within a rocker arm roller shaft bore 14 also extending laterally through the elongate body 17 and proximate the driven end portion 13 of the intake rocker arm assembly 12. The rocker arm roller 18 is in contact with a cam 30 to rotate therewith and communicate movements reflective of the contours of the rotating cam 30 to the driven end portion 13 of the intake rocker arm assembly 12. The resulting motion of the driving end portion 15 opens the at least one intake valve 52. The relative disposition of the rocker arm shaft 26 (acting as a fulcrum) between the driven end portion 13 and the driving end portion 15 of the intake rocker arm assembly 12 defines the first-class lever.

Also shown by FIG. 4 is a pin housing 22 fixedly disposed on each elongate body 17 and supporting a rocker arm pin 24 that also extends parallel to and spaced apart from the rocker arm shaft 26. The pin housing 22, with its rocker arm pin 24, is mounted generally between the driven end portion 13 of the intake rocker arm assembly 12 and the rocker arm shaft 26. The relative disposition of the rocker arm pin 24, from which the exhaust-valve-gas-intake-valve-actuating force emanates, between the rocker arm shaft 26 (acting again as a fulcrum) and the driven end 13 of the intake rocker arm assembly 12 defines the second-class lever.

Disposed proximate the intake rocker arm assembly 12 is a force transfer assembly, generally indicated by reference numeral 31, fixedly disposed relative to the rocker arm shaft 26. The force transfer assembly has a hydraulic fluid housing 32, within which, for each combustion chamber, is a follower piston cylinder 34 and a driven piston cylinder 36 that communicate with each other and with a hydraulic fluid orifice, generally indicated by reference numeral 38, via a hydraulic fluid passage 39 extending therebetween. A solenoid valve 40 is connected between a source 37 of hydraulic fluid and the fluid orifice 38 to control the flow of hydraulic fluid therebetween.

A follower piston 44 is slidably disposed, at least partially, within the follower piston cylinder 34. The pin housing 22 is shown partially broken away by FIG. 4 to reveal the adjoining disposition of the rocker arm pin 24 relative to the follower piston 44. In the embodiment shown, as the cam 30 is rotated, the intake rocker arm assembly 12 is forced to pivot alternately in first and second angular directions, as indicated respectively by arrows A and B, about the rocker arm shaft 26, driving the rocker arm pin 24 alternately up and down in a generally vertical direction and driving the follower piston 44 in alternately up and down directions, respectively increasing and decreasing fluid pressure within the fluid passage and cylinders of the hydraulic fluid housing 32.

A driven piston 46 is slidably disposed within the driven piston cylinder 36, which has a larger diameter than that of the follower piston cylinder 34 and responds to an increase of fluid pressure by moving in an outward direction from the driven piston cylinder 36. A driven piston follower 48 is disposed between the driven piston 46 and the at least one exhaust gas intake valve 50 and follows movements of the driven piston 46. The at least one exhaust gas intake valve 50, and, as shown in the embodiment illustrated by FIG. 4, preferably a pair of exhaust gas intake valves 50, follows the movements of the driven piston follower 48. The intake valve 52 is disposed proximate to, and follows vertical movements of, the driving end portion 15 of the intake rocker arm assembly 12.

The EGR REGION shown by FIG. 1 represents a period during the intake stroke of an engine when the pressure of exhaust gas is greater that the pressure of gas in the combustion chamber. For each combustion chamber, the configurations and relative orientations of the intake rocker arm assembly and the force transfer assembly are such that, during this period, the at least one exhaust gas intake valve is opened, allowing exhaust gas to flow into the combustion chamber and thereby establish internal exhaust gas recirculation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a four-stroke, internal combustion, compression-ignition engine having at least one engine cylinder, at least one combustion chamber and a crankshaft, an internal exhaust gas recirculation (EGR) system for reducing oxides of nitrogen (NOx), for each combustion chamber the system comprising:

at least one intake valve disposed to admit air into the combustion chamber; and
at least one exhaust gas intake valve;
a rocker arm shaft fixedly supported by the engine;
an intake rocker arm assembly having a driven end portion and a driving end portion and being pivotally supported at a generally central location between the two end portions by the rocker arm shaft, the at least one intake valve being opened in response to an intakevalve-actuating force that emanates from the driving end portion when the intake rocker arm assembly is pivoted in a first angular direction, the at least one exhaust gas intake valve being opened in response to an exhaust-gas-intake-valve-actuating force that emanates from a point between the driven end portion and the rocker arm shaft when the intake rocker arm assembly is pivoted in the first angular direction;

a force transfer assembly fixedly disposed relative to the engine for communicating the exhaust-gas-intake-valve-actuating force from the intake rocker arm assembly to the at least one exhaust gas intake valve; and a cam mounted on and rotatable with a camshaft to pivot the intake rocker arm assembly in the first angular direction, the configurations and relative orientations of the intake rocker arm assembly and the force transfer assembly being such that the exhaust gas intake valve is opened during at least a portion of an engine intake stroke when the intake valve is open and the pressure of exhaust gas is greater than the pressure of gas in the combustion chamber, thus allowing exhaust gas to flow into the combustion chamber to establish internal exhaust gas recirculation.

2. The EGR system as defined by claim 1, wherein the force transfer assembly is fixedly disposed relative to the engine and has a hydraulic fluid housing including therein a follower piston cylinder and a driven piston cylinder that communicate with each other via a hydraulic fluid passage containing hydraulic fluid and that slidably receive, at least partially, a follower piston and a driver piston, respectively, the follower piston responding to an increase in the exhaust-gas-intake-valve-actuating force by increasing hydraulic fluid pressure within the hydraulic fluid passage, the hydraulic fluid applying a force to the driven piston, in response to which the driven piston opens the at least one exhaust gas intake valve.

3. The EGR system as defined by claim 2, wherein the intake rocker arm assembly comprises a first class lever, and a component of the force applied to the driven end portion of the intake rocker arm assembly by the cam to pivot the intake rocker assembly about the intake rocker arm shaft in the first angular direction is communicated to the driving end portion of the intake rocker arm assembly to open the at least one intake valve; and wherein the intake rocker arm assembly additionally comprises a second class lever, and a component of the force applied by the cam to pivot the intake rocker assembly in the first angular direction is communicated to a point between the driven end portion and the rocker arm shaft to cause the force transfer assembly to open the at least one exhaust gas intake valve.

4. The EGR system as defined in claim 3, wherein the diameter of the driven piston cylinder is greater than that of the follower piston cylinder.

5. The EGR system as defined by claim 4, wherein the intake rocker arm assembly further comprises:

an elongate body pivotally mounted on the rocker arm shaft and extending from the driven end portion to the driving end portion of the intake rocker arm assembly;

a pin housing fixedly disposed on the elongate body at a point between the driven end portion of the intake rocker arm assembly and the rocker arm shaft; and a rocker arm pin extending from the pin housing and being parallel to and spaced apart from the rocker arm shaft, the rocker arm pin being in contact with the follower piston to force the follower piston deeper into the follower piston cylinder in response to the exhaust-gas-intake-valve-actuating force when the intake rocker arm assembly is pivoted in the first angular direction.

6. The EGR system as defined by claim 5, wherein the intake rocker arm assembly further comprises:

a rocker arm roller shaft extending through a rocker arm roller shaft bore proximate the driven end portion of the intake rocker arm assembly, the rocker arm roller shaft being parallel to and spaced apart from the rocker arm shaft; and a rocker arm roller rotatably mounted on the rocker arm roller shaft, the rocker arm roller being in peripheral contact with the cam to rotate therewith and communicate movements reflective of the contours of the cam to the driven end portion of the intake rocker arm assembly.

7. The EGR system as defined by claim 6, further comprising a driven piston follower disposed between the driven piston and the at least one exhaust gas intake valve to communicate driven piston movement to the at least one exhaust gas intake valve.

8. The EGR system as defined by claim 7, further comprising a solenoid valve connected between the hydraulic fluid passage and a source of hydraulic fluid to controllably supply hydraulic fluid to the hydraulic fluid passage.

9. The EGR system as defined by claim 8, wherein the at least one exhaust gas intake valve comprises a pair of exhaust gas intake valves.

10. An internal exhaust gas recirculation (EGR) system for reducing oxides of nitrogen (NOx) in a four-stroke, internal combustion, compression-ignition engine having at least one engine cylinder, at least one combustion chamber, and a crankshaft, for each engine cylinder the system comprising:

at least one intake valve;

at least one exhaust gas intake valve;

a rocker arm shaft fixedly supported by the engine;

an intake rocker arm assembly having a driven end portion and a driving end portion and being pivotally supported at a generally central location between the two end portions by the rocker arm shaft, the at least one intake valve being opened in response to an intake-valve-actuating force that emanates from the driving end portion when the intake rocker arm assembly is pivoted in the first angular direction, the at least one exhaust gas intake valve being opened in response to an exhaust-gas-intake-valve-actuating force that emanates from a point between the driven end portion and the rocker arm shaft when the intake rocker arm assembly is pivoted in the first angular direction;

a force transfer assembly fixedly disposed relative to the engine and having a hydraulic fluid housing including therein a follower piston cylinder and a driven piston cylinder that communicate with each other via a hydraulic fluid passage containing hydraulic fluid, a follower piston slidably disposed at least partially within the follower piston cylinder and being forced farther into the follower piston cylinder by the driven end portion of the intake rocker arm assembly when the intake rocker arm assembly is pivoted in a first angular direction, and a driven piston slidably disposed at least partially within the driven piston cylinder and being forced outwardly from the driven piston cylinder when the follower piston is forced inwardly into the follower piston cylinder; and a cam mounted on and rotatable with a camshaft to pivot the intake rocker arm assembly in the first angular direction, the at least one intake valve being opened by the driving end portion of the intake rocker arm assembly when the driven end portion is pivoted in the first angular direction, the at least one exhaust gas intake valve being opened when the driven piston is forced outwardly from the driven piston cylinder as a result of the intake rocker arm assembly being pivoted in the first angular direction, and the configurations and relative orientations of the intake rocker arm assembly and the force transfer assembly being such that the exhaust gas intake valve is opened during at least a portion of an engine intake stroke when the pressure of exhaust gas is greater than the pressure of gas in the combustion chamber, thus allowing exhaust gas to flow into the combustion chamber to establish internal exhaust gas recirculation.

11. The EGR system as defined in claim 10, wherein the intake rocker arm assembly comprises a first class lever, and a component of the force applied to the driven end portion of the intake rocker arm assembly by the cam to pivot the intake rocker arm assembly about the intake rocker arm shaft in the first angular direction is communicated to the driving end portion of the intake rocker arm assembly to open the at least one intake valve; and wherein the intake rocker arm assembly additionally comprises a second class lever, and a component of the force applied by the cam to pivot the intake rocker assembly in the first angular direction is communicated to a point between the driven end portion and the rocker arm shaft to cause the force transfer assembly to open the at least one exhaust gas intake valve.

12. The EGR system as defined in claim 11, wherein the diameter of the driven piston cylinder is greater than that of the follower piston cylinder.

13. The EGR system as defined by claim 12, wherein the at least
one intake rocker arm assembly further comprises:
an elongate body pivotally mounted on the rocker arm shaft and extending from the driven end portion to the driving end portion of the intake rocker arm assembly;
a pin housing fixedly disposed on the elongate body proximate the driven end portion of the intake rocker arm assembly; and
a rocker arm pin extending from the pin housing and being parallel to and spaced apart from the rocker arm shaft, the rocker arm pin being in contact with the follower piston to force the follower piston deeper into the follower piston cylinder when an intake rocker arm assembly is pivoted in the first angular direction.

14. The EGR system as defined by claim 13, wherein the intake rocker arm assembly further comprises:
a rocker arm roller shaft extending through a rocker arm roller shaft bore proximate the driven end portion of the intake rocker arm assembly, the rocker arm roller shaft being parallel to and spaced apart from the rocker arm shaft; and
a rocker arm roller rotatably mounted on the rocker arm roller shaft, the rocker arm roller being in contact with the cam to rotate therewith and communicate movements reflective of the contours of the cam to the driven end portion of the intake rocker arm assembly.

15. The EGR system as defined by claim 14 further comprising a driven piston follower disposed between the driven piston and the at least one exhaust gas intake valve to communicate driven piston movement to the at least one exhaust gas intake valve.

16. The EGR system as defined by claim 15, further comprising a solenoid valve connected between the hydraulic fluid passage and a source of hydraulic fluid to controllably supply hydraulic fluid to the hydraulic fluid passage.

17. The EGR system as defined by claim 16, wherein the at least one exhaust gas intake valve comprises a pair of exhaust gas intake valves.

18. A four-stroke, internal combustion, compression-ignition engine comprising:
at least one engine cylinder;
at least one combustion chamber;
a rocker arm shaft fixedly supported by the engine;
a crankshaft;
an internal exhaust gas recirculation system, for each engine cylinder comprising:
at least one intake valve;
at least one exhaust gas intake valve
an intake rocker arm assembly having a driven end portion and a driving end portion and being pivotally supported at a generally central location between the two end portions by the rocker arm shaft, the at least one intake valve being opened in response to an intake-valve-actuating force that emanates from the driving end portion when the intake rocker arm assembly is pivoted in the first angular direction, the at least one exhaust gas intake valve being opened in response to an exhaust-gas-intake-valve-actuating force that emanates from a point between the driven end portion and the rocker arm shaft when the intake rocker arm assembly is pivoted in the first angular direction;
a force transfer assembly fixedly disposed relative to the engine and having a hydraulic fluid housing including therein a follower piston cylinder and a driven piston cylinder that communicate with each other via a hydraulic fluid passage containing hydraulic fluid, a follower piston slidably disposed at least partially within the follower piston cylinder and being forced farther into the follower piston cylinder by the driven end portion of the intake rocker arm assembly when the intake rocker arm assembly is pivoted in a first angular direction, and a driven piston slidably disposed at least partially within the driven piston cylinder and being forced outwardly from the driven piston cylinder when the follower piston is forced inwardly into the follower piston cylinder; and
a cam mounted on and rotatable with a camshaft to pivot the intake rocker arm assembly in the first angular direction,
the at least one intake valve being opened by the driving end portion of the intake rocker arm assembly when the intake rocker arm assembly is pivoted in the first angular direction,
the at least one exhaust gas intake valve being opened when the driven piston is forced outwardly from the driven piston cylinder as a result of the intake rocker arm assembly being pivoted in the first angular direction, and
the configurations and relative orientations of the intake rocker arm assembly and the force transfer assembly being such that the exhaust gas intake valve is opened during at least a portion of an engine intake stroke when the pressure of exhaust gas is greater than the pressure of gas in the combustion chamber, thus allowing exhaust gas to flow into the combustion chamber to establish internal exhaust gas recirculation.

19. The EGR system as defined in claim 18, wherein the intake rocker arm assembly comprises a first class lever, and a component of the force applied to the driven end portion of the intake rocker arm assembly by the cam to pivot the intake rocker arm assembly about the intake rocker arm shaft in the first angular direction is communicated to the driving end portion of the intake rocker arm assembly to open the at least one intake valve; and wherein the intake rocker arm assembly additionally comprises a second class lever, and a component of the force applied by the cam to pivot the intake rocker assembly in the first angular direction is communicated to a point between the driven end portion and the rocker arm shaft to cause the force transfer assembly to open the at least one exhaust gas intake valve.

20. The EGR system as defined in claim 19, wherein the diameter of the driven piston cylinder is greater than that of the follower piston cylinder.

21. The EGR system as defined by claim 20, wherein the at least one intake rocker arm assembly further comprises:
   an elongate body pivotally mounted on the rocker arm shaft and extending from the driven end portion to the driving end portion of the intake rocker arm assembly;
   a pin housing fixedly disposed on the elongate body proximate the driven end portion of the intake rocker arm assembly; and
   a rocker arm pin extending from the pin housing and being parallel to and spaced apart from the rocker arm shaft, a rocker arm pin being in contact with the follower piston to force the follower piston deeper into the follower piston cylinder when an intake rocker arm assembly is pivoted in the first angular direction.

22. The EGR system as defined by claim 21, wherein the intake rocker arm assembly further comprises:
   a rocker arm roller shaft extending through a rocker arm roller shaft bore proximate the driven end portion of the intake rocker arm assembly, the rocker arm roller shaft being parallel to and spaced apart from the rocker arm shaft; and
   a rocker arm roller rotatably mounted on the rocker arm roller shaft, the rocker arm roller being in contact with a cam to rotate therewith and communicate movements reflective of the contours of the cam to the driven end portion of the intake rocker arm assembly.

23. The EGR system as defined by claim 22 further comprising a driven piston follower disposed between the driven piston and the at least one exhaust gas intake valve to communicate driven piston movement to the at least one exhaust gas intake valve.

24. The EGR system as defined by claim 23 further comprising a solenoid valve connected between the hydraulic fluid passage and a source of hydraulic fluid to controllably supply hydraulic fluid to the hydraulic fluid passage.

25. The EGR system as defined by claim 24, wherein the at least one exhaust gas intake valve comprises a pair of exhaust gas intake valves.

26. In a four-stroke, internal combustion, compression-ignition engine having at least one engine cylinder, at least one combustion chamber, at least one intake valve, and a crankshaft, a method of reducing NOx, the method comprising the steps of:
   a. providing at least one exhaust gas intake valve;
   b. providing a force transfer assembly fixedly disposed relative to the engine and having a hydraulic fluid housing including therein a follower piston cylinder and a driven piston cylinder that communicate with each other via a hydraulic fluid passage containing hydraulic fluid;
   c. providing a follower piston slidably disposed at least partially within the follower piston cylinder and being forcible deeper into the follower piston cylinder by the driven end portion of the intake rocker arm assembly when the intake rocker arm assembly is pivoted in the first angular direction;
   d. providing a driven piston slidably disposed at least partially within the driven piston cylinder and being forced outwardly from the driven piston cylinder when the follower piston is forced inwardly into the follower piston cylinder;
   e. providing a rocker arm shaft fixedly supported by the engine;
   f. providing an intake rocker arm assembly having a driven end portion and a driving end portion and being pivotally supported at a generally central location between the two end portions by the rocker arm shaft;
   g. providing a cam mounted on and rotatable with a camshaft to pivot the intake rocker arm assembly in a first angular direction, the at least one intake valve being opened by the driving end portion of the intake rocker arm assembly when the intake rocker arm assembly is pivoted in the first angular direction, the at least one exhaust gas intake valve being opened when the driven piston is forced outwardly from the driven piston cylinder as a result of the intake rocker arm assembly being pivoted in the first angular direction, the at least one intake valve and the at least one exhaust gas intake valve subsequently closing when the intake rocker arm assembly is pivoted in a second angular direction, the timing of the opening and closing of both the intake and exhaust gas intake valves being functions of the pivoting of the intake rocker arm assembly; and
   h. configuring and orienting the crankshaft, the cam, the intake rocker arm assembly, the follower piston and the driven piston such that, during a period when the pressure of the exhaust gas is greater than the pressure of the gas in the combustion chamber and the at least one exhaust gas intake valve is open, exhaust gas flows into the combustion chamber and internal exhaust gas recirculation occurs.

* * * * *